United States Patent [19]

Hauser et al.

[11] Patent Number: 4,518,460
[45] Date of Patent: May 21, 1985

[54] PRESS ROLL FOR WEB MATERIAL

[75] Inventors: Ludwig Hauser; Wilhelm Wanke, both of Heidenheim, Fed. Rep. of Germany

[73] Assignee: J.M. Voith GmbH, Fed. Rep. of Germany

[21] Appl. No.: 425,088

[22] PCT Filed: Jan. 21, 1982

[86] PCT No.: PCT/EP82/00007
§ 371 Date: Sep. 21, 1982
§ 102(e) Date: Sep. 21, 1982

[87] PCT Pub. No.: WO82/02567
PCT Pub. Date: Aug. 5, 1982

[30] Foreign Application Priority Data

Jan. 27, 1981 [DE] Fed. Rep. of Germany ....... 3102526

[51] Int. Cl.³ ............................ D21F 3/02; D21F 3/08
[52] U.S. Cl. ................................. 162/361; 29/113 AD; 29/116 AD; 100/118; 100/93 RP; 100/153; 162/205; 162/358
[58] Field of Search ............ 162/358, 205, 361, 360.1; 100/160, 162 B, 170, 118, 93 RP, 153; 29/116 AD, 113 AD

[56] References Cited

U.S. PATENT DOCUMENTS

| | | | |
|---|---|---|---|
| 2,430,868 | 11/1947 | Francis, Jr. | 100/153 X |
| 3,808,092 | 4/1974 | Busker | 162/205 |
| 3,853,698 | 12/1974 | Mohr | 162/358 |
| 3,974,026 | 8/1976 | Emson et al. | 162/358 |
| 4,069,569 | 1/1978 | Meckel | 29/116 AD |
| 4,287,021 | 9/1981 | Justus et al. | 162/358 |

FOREIGN PATENT DOCUMENTS

| | | |
|---|---|---|
| 1923784 | 12/1970 | Fed. Rep. of Germany . |
| 2219836 | 9/1974 | France . |
| 641466 | 8/1950 | United Kingdom . |
| 1118588 | 7/1968 | United Kingdom . |
| 1255453 | 12/1971 | United Kingdom . |
| 2057027 | 3/1981 | United Kingdom . |

Primary Examiner—William F. Smith
Assistant Examiner—K. M. Hastings
Attorney, Agent, or Firm—Ostrolenk, Faber, Gerb & Soffen

[57] ABSTRACT

The disclosure concerns a press roll for pressing a web passing through a nip between the press roll and an associated roll, particularly in a paper making machine. The press roll includes a rigid inner shell and flexible, elastic outer shell which rotates around the inner shell. An outwardly pressurized elongate pressure ledge is placed in the inner shell at the nip to produce an elongated nip and to be pressurized in opposition to the associated roll at the nip. In an alternate embodiment, the pressure ledge has a pressurized, outwardly facing recess facing the outer shell. A drive roll drives the outer shell to rotate around the inner shell. Recesses in the inner shell carry lubricant for lubricating the rotation thereof.

12 Claims, 2 Drawing Figures

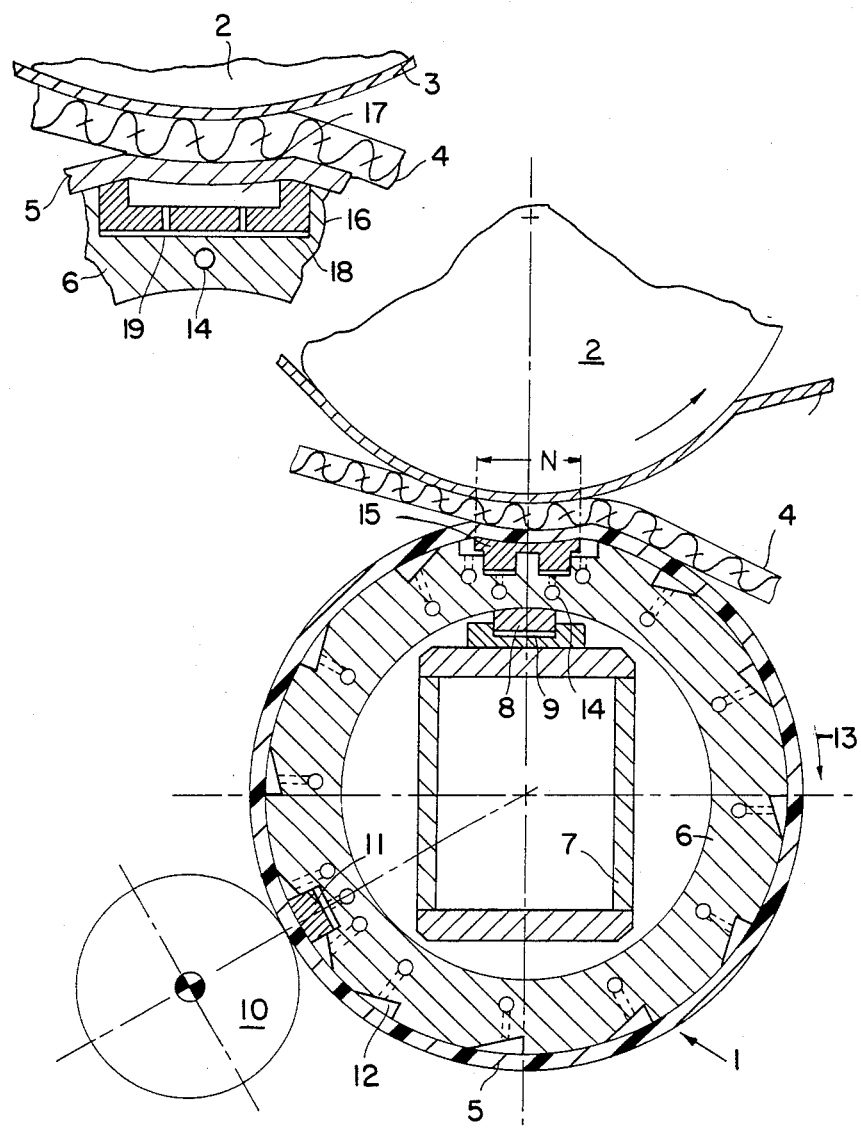

PRESS ROLL FOR WEB MATERIAL

The present invention relates to a press roll, which cooperates with an associated roll, for pressing web material, and is particularly for use in a paper making machine for pressing out the water from a web of fibrous material supported by a felt or support fabrics. The press roll is provided with a device having an elastically deformable outer shell in order to form an elongated nip and an inner shell for supporting the outer shell on its periphery.

It is known to use such a lengthened nip in order substantially to increase the removal of water as compared with ordinary press rolls. In the case of graphic papers, for instance, the solids content of the web can in this way be increased from between 40 to 45% absolute dryness to between 55 to 60% absolute dryness. In the case of toilet papers it is important that, in addition to the increase in the dryness, the product can be very positively influenced with respect to its required softness by an extended nip. Upon the cooperation of two rolls, at least one of which has a deformable outer shell arranged on a stationary roll shell, a longer nip will be obtained in the direction of the web. Such a roll is known, for instance, from German Provisional Patent AS No. 25 22 657. The roll shown there is intended, in particular, for use as backup impression cylinder in rotary printing. However, it is not suitable for a higher pressure such as is necessary in particular for the removal of water from webs of paper. The upper pressure limit is about 25 kgf/cm and its life is very short. A rubber covering, for instance, heats up and leads to the destruction of the web.

In order to obtain a lengthened press nip with higher pressure it is known, particularly in the construction of paper making machines, to conduct the support felt together with the web of paper between two rotating belts against which hydrostatic pressure members are pressed from both sides over a given length. Due to the special shape and development of the pressure members a given pressure profile can be obtained along the web (see U.S. Pat. No. 3,808,092). The sealing of such a device from the outside is, however, very critical. It is particularly problematical if the pressure members are to be lifted off from the web. This cannot be done without previously drawing off the oil.

It is furthermore known to press a rotating band by means of a pressure shoe hydrostatically against a rotating roll (see U.S. Pat. No. 3,853,698). In this case also it is very difficult to seal it against the emergence of oil on its sides. Even with expensive seals such a design cannot be made completely tight. This is very detrimental for operation. Dirt can settle on the exposed part of the band. It is therefore necessary that it be scraped off before entrance. In this case also, the hydrostatic character is very detrimental upon the opening and closing of the press shoe.

A tube roll for pressing a web of material against a drying cylinder is also known. The tube-like outer shell of that tube roll is supported on a co-rotating inner shell over self-contained segment tubes which are distributed along the inner periphery of the outer shell and which can be inflated in the nip to the application pressure (see German Provisional Patent AS No. 19 23 784). Such a device requires a special control device by which the segment tubes which are present at the time in the nip are acted on by pressure. This results in a relatively complicated and expensive construction, in which, in particular, the seal between the parts which rotate with respect to each other is very problematical. The tube segments are unsuitable for high pressures, because pressure can be produced only by a gas. When employing non-compressible liquid pressure fluids, as are necessary for the production of higher pressures, excessively high flow velocities in the feed and discharge lines of the individual chambers would occur at high machine speeds of more than 200 meters per minute, leading to cavitation.

The object of the present invention is to develop a press roll of the aforementioned type in such a manner that no special problems as to sealing arise, that leakages onto the product being produced are avoided, and that the use of relatively high pressures between outer shell and associated roll is possible.

The invention solves this problem by means of a press roll in which the inner shell is stationary, the outer shell is slideably supported directly on the inner shell, and at least one pressure ledge rests against the inner side of the outer shell, is capable of being acted on by pressure from the inside and is located in the nip.

In such a press roll in accordance with the invention, hydraulic means within the roll are mechanically closed off so that no leakage to the product being produced is possible. No complicated control members are necessary for the feeding of the pressure fluid. Since the inner shell on whose periphery the pressure chambers are formed is stationary, it is also not necessary to continuously force the pressure fluid into the pressure chambers and then force it out again, so that the danger of cavitation is completely done away with.

In accordance with one preferred embodiment of the invention, the outer shell is driven by at least one drive roll which can be pressed against the outer shell.

In one advantageous embodiment of the invention, recesses outside the nip serve to feed a lubricant in order to assure easy sliding of the outer shell which rests on the inner shell.

In order to obtain a suitable drive by the drive roll or rolls which can be pressed against the outer shell, a pressing ledge which rests against the inside of the outer shell and is adapted to be acted on by pressure from the inside is arranged in the inner shell at the place where a drive roll presses against the outer shell. By chambers for a lubricant which are provided alongside the pressure ledge, dependable sliding of the outer shell on the pressure ledge is also assured.

Various embodiments of the invention will be explained below with reference to the drawing, in which:

FIG. 1 diagrammatically shows a press roll in accordance with the invention, seen in cross section, and FIG. 2 shows, on a larger scale, a portion of an alternative development of the press roll in the region of the nip.

The press roll 1 shown in FIG. 1 cooperates with the associated roll 2. The associated roll 2 is developed in known manner as a rigid roll. Water is removed from the web of paper 3 between the two rolls, by means of a felt 4 arranged between paper web 3 and press roll 1. In the figure shown, paper web 3 and felt 4 move from left to right.

The press roll 1 consists of an outer elastically deformable roll-shell 5 of a reinforced plastic, for instance polyurethane. It may also consist of rubber reinforced by steel or textile fabric. Within this outer shell 5 there is arranged an inner shell 6 which does not rotate together with the outer shell. The sag of this inner shell should be as small as possible or even be equal to zero. Accordingly, within the inner shell 6 there is arranged a thin support 7 or yoke on which the inner shell rests via a plurality of piston-shaped rams 8. The rams are arrayed along the axial length of the shell 6, whereby only one ram can be seen. Each of the rams 8 is movable in a chamber 9 which rests on the yoke 7 and can be acted on by pressure. The chambers 9 can be acted on with different pressures.

A drive roll 10 serves for driving the outer shell 5. At the place where the drive roll 10 rests against the outer shell 5 a hydraulically actuatable slide shoe 11 is provided on the inside of the outer shell. The slide shoe 11 can be used together with the drive roll 10 also for the retightening of the elastic outer shell if the latter has lengthened. For this purpose, the mounting of the drive roll can be made hydraulically displaceable within certain limits perpendicular to the press roll 1. The drive roll 10 can also be obliquely displaceable in order to bring the elastic outer shell back again into the correct position should it run out of line. Instead of the single drive roll 10 shown, a second drive roll can also be provided. In such case the two drive rolls are preferably arranged symmetrically to the associated roll 2. By means of two drive rolls the tensile stress in the outer shell along the nip can be brought to a desired constant value, for instance in the manner that the second roll, as seen in the direction of rotation, travels by a certain given amount faster than the first roll, for instance 1%.

The outer shell 5 slides directly on the surface of the inner shell 6. The recesses 12 in the inner shell 6 serve as lubricating chambers. The outer surface of the inner shell 6 is preferably coated, for instance with Teflon, for the event that it should run dry. The chambers 12 taper down in the direction of rotation of the outer shell, indicated by the arrow 13.

The pressure in the nip N is produced by a pressure ledge 15 which can be acted on by pressure via conduits 14 which are supplied from a pressure source (not shown). Instead of the hydrostatic formation of the pressure in the nip N as shown in the drawing, it may also be effected hydrodynamically. The pressure ledge 15 is located in a space in the inner shell. The inner shell has an outer periphery and an inner periphery, and the space is defined therein at the outer periphery and open towards the nip. The space does not extend through the inner periphery.

In the enlarged view of a portion of the press roll in the region of the nip N shown in FIG. 2, in place of the ledge 15 the pressure ledge 16 has a recess 17 facing toward the outer shell 5 the recesses being connected by throttle conduits 19 with the space 18 which is acted on by pressure by the pressure fluid introduced through the feed line 14. Pressure is built up in the recess 17.

We claim:

1. A press roll, for cooperating with an associated roll at a nip, to press web material between the press and associated rolls at the nip, the press roll comprising:

a relatively rigid, relatively stationary, inner shell having an outer periphery and an inner periphery, the outer periphery having a substantially circular cross section; the inner shell further having a space defined therein at the outer periphery and open toward the nip, said space not extending through the inner periphery;

a relatively more flexible, elastically deformable, outer shell supported outside the inner shell, and the outer shell including an inner side for sliding on and over the inner shell outer periphery; the outer shell being rotatable with respect to the inner shell;

a pressure ledge located at the nip and having a length around the press roll for extending past the nip and for forming an extended nip; the pressure ledge resting against the inner side of the outer shell; the pressure ledge being movably mounted in the space in the inner shell; and pressure means in the inner shell for urging the pressure ledge outwardly against the inner side of the outer shell.

2. The press roll of claim 1, further comprising recesses in the outer periphery of the inner shell and outside the extended nip for feeding lubricant from the recesses to between the inner shell outer periphery and the inner side of the outer shell.

3. The press roll of claim 2, wherein the outer shell is normally rotatable with respect to the inner shell in a rotation direction; the recesses in the inner shell extend into the periphery of the inner shell and taper from a greater to a lesser depth into the inner shell in the normal direction of rotation of the outer shell with respect to the inner shell.

4. The press roll of claim 1, wherein the pressure ledge has a side facing the inner side of the outer shell, the ledge having a recess defined therein at the side facing the outer shell and a pressure transmitting throttle hole defined through the ledge to the recess in the ledge; the pressure means being adapted for both urging the ledge outwardly and for delivering pressure to the throttle hold for pressurizing the recess in the ledge.

5. The press roll of claim 1, further comprising a stationary yoke inside the inner shell for supporting the inner shell against sagging upon pressure being applied to the press roll at the nip.

6. The press roll of claim 1, wherein the inner shell is annular in shape and the outer shell wraps completely around the inner shell.

7. In combination, the press roll of claim 1, and an associated roll; the press roll and the associated roll being respectively so oriented and placed that they press together for defining the nip thereof.

8. The combination of claim 7 and a drive roll placed for being pressed against the outer shell, and the drive roll being drivable for rotating and for driving the outer shell of the press roll to rotate.

9. The combination of claim 8, further comprising a second pressure ledge in the inner shell for being pressurized to press against the inner side of the outer shell, and the second pressure ledge being placed in opposition to the drive roll where the drive roll presses against the outer shell of the press roll.

10. In combination, the press roll of claim 1 and a drive roll placed for being pressed against the outer shell, and the drive roll being drivable for rotating and for driving the outer shell of the press roll to rotate.

11. A press roll, for cooperating with an associated roll at a nip, to press web material between the press and associated rolls at the nip, the press roll comprising:

a relatively rigid, relatively stationary, inner shell having an outer periphery;

a relatively more flexible, elastically deformable, outer shell supported outside the inner shell, and the outer shell including an inner side for sliding on and over the inner shell periphery; the outer shell being normally rotatable with respect to the inner shell in a rotation direction;

a pressure ledge in the inner shell located at the nip and of a length around the press roll for extending past the nip and for forming an extended nip; the pressure ledge resting against the inner side of the outer shell; pressure means in the inner shell for acting upon the pressure ledge for urging the pressure ledge against the inner side of the outer shell;

the inner shell further having recesses defined in the outer periphery thereof and outside the extended nip for feeding lubricant from the recesses to between the inner shell outer periphery and the inner side of the outer shell;

each of the recesses in the inner shell extending into the outer periphery of the inner shell and tapering from a greater to a lesser depth into the inner shell in the normal direction of rotation of the outer shell with respect to the inner shell.

12. A combination of rolls, comprising:
(A) an associated roll;
(B) a press roll, for cooperating with the associated roll at a nip, to press web material between the press and associated rolls at the nip, the press roll and the associated roll being respectively so oriented and placed that they press together for defining the nip; the press roll comprising:
 (1) a relatively rigid, relatively stationary, inner shell having an outer periphery;
 (2) a relatively more flexible, elastically deformable, outer shell supported outside the inner shell, and the outer shell including an inner side for sliding on and over the inner shell periphery; the outer shell being rotatable with respect to the inner shell;
 (3) a pressure ledge in the inner shell located at the nip and of a length around the press roll for extending past the nip and for forming an extended nip; the pressure ledge resting against the inner side of the outer shell; and
 (4) pressure means in the inner shell for acting upon the pressure ledge for urging the pressure ledge against the inner side of the outer shell; and
(C) a drive roll placed for being pressed against the outer shell of the press roll, the drive roll being drivable for rotating and for driving the outer shell of the press roll to rotate; the press roll further comprising a second pressure ledge in the inner shell for being pressurized to press against the inner side of the outer shell, the second pressure ledge being placed in opposition to the drive roll where the drive roll presses against the outer shell of the press roll.

* * * * *